US012602511B1

(12) United States Patent

Jois et al.

(10) Patent No.: US 12,602,511 B1

(45) Date of Patent: Apr. 14, 2026

(54) DATA PRIVACY CONTEXT MANAGEMENT SYSTEM

(71) Applicant: SAP SE, Walldorf (DE)

(72) Inventors: Sharath Jois, Bangalore (IN); Girish Sainath, Bangalore (IN); Aruna K, Bangalore (IN)

(73) Assignee: SAP SE, Walldorf (DE)

( * ) Notice: Subject to any disclaimer, the term of this patent is extended or adjusted under 35 U.S.C. 154(b) by 30 days.

(21) Appl. No.: 18/911,611

(22) Filed: Oct. 10, 2024

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01)

(58) Field of Classification Search
CPC ........................... G06F 21/6245; G06F 21/604
See application file for complete search history.

(56) References Cited

U.S. PATENT DOCUMENTS

| | | | | |
|---|---|---|---|---|
| 10,484,234 B1 * | 11/2019 | Sun | ..................... | H04L 41/0631 |
| 11,004,125 B2 * | 5/2021 | Barday | ................ | G06Q 50/265 |
| 11,023,842 B2 * | 6/2021 | Beaumont | ............... | G06F 15/76 |
| 12,081,569 B2 * | 9/2024 | Shahul Hameed | .......................... | |
| | | | | H04L 63/1425 |
| 2017/0359385 A1 * | 12/2017 | Barday | .................. | G06Q 10/06 |
| 2018/0352001 A1 * | 12/2018 | Barday | .................. | G06Q 10/06 |
| 2019/0311094 A1 * | 10/2019 | Brannon | ............... | G06F 21/316 |
| 2020/0201963 A1 * | 6/2020 | Brannon | ............ | G06F 21/6245 |
| 2020/0293682 A1 * | 9/2020 | Zonouz | ................... | G06F 21/52 |

* cited by examiner

*Primary Examiner* — Michael R Vaughan

(74) *Attorney, Agent, or Firm* — SCHWEGMAN LUNDBERG & WOESSNER, P.A.

(57) ABSTRACT

Systems and methods are provided for analyzing an event received from an application to determine that a new system process has been created and generating a privacy context for the new system process, in real time from receiving the event from the application. For example, the systems and methods analyze application metadata associated with the new system process to determine a process definition for the new system process, extract process flow details for the process definition, analyze the extracted process flow details to determine entities associated with the new system process and data categories associated with the new system process and generate the privacy context based on the entities associated with the new system process and the data categories associated with the new system process, the privacy context linking a data controller, one or more data categories and a role.

20 Claims, 8 Drawing Sheets

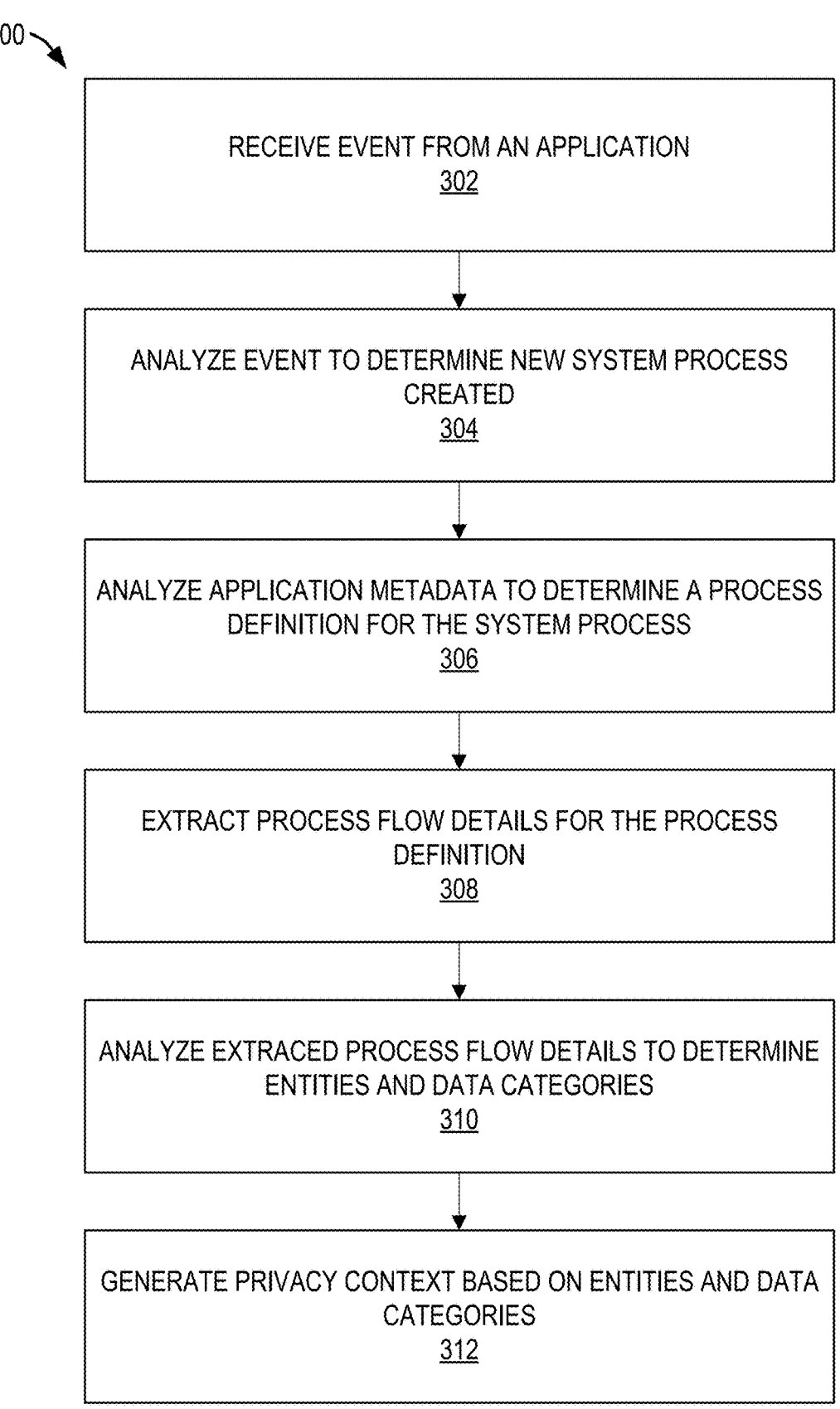

300

RECEIVE EVENT FROM AN APPLICATION
302

ANALYZE EVENT TO DETERMINE NEW SYSTEM PROCESS
CREATED
304

ANALYZE APPLICATION METADATA TO DETERMINE A PROCESS
DEFINITION FOR THE SYSTEM PROCESS
306

EXTRACT PROCESS FLOW DETAILS FOR THE PROCESS
DEFINITION
308

ANALYZE EXTRACED PROCESS FLOW DETAILS TO DETERMINE
ENTITIES AND DATA CATEGORIES
310

GENERATE PRIVACY CONTEXT BASED ON ENTITIES AND DATA
CATEGORIES
312

DATA PRIVACY CONTEXT MANAGEMENT SYSTEM

BACKGROUND

The increasing occurrence of data breaches in large business enterprises and the resulting theft of sensitive personal data has initiated many efforts in data security. The European Union's General Data Protection Regulation (GDPR), for example, is an approach that is forcing business in the EU to rethink how they collect, manage and govern access to personal data. A large enterprise can have multiple independent business platforms that their customers and suppliers use, and, as such, their personal data can become spread across those various business platforms. The challenge of managing personal data in these business environments is amplified because each business platform can have its own disparate set of tools, applications and policies for securing the private data that they are entrusted with.

BRIEF DESCRIPTION OF THE DRAWINGS

Various ones of the appended drawings merely illustrate example embodiments of the present disclosure and should not be considered as limiting its scope.

FIG. 3 comprises a flow chart illustrating aspects of a method, according to some example embodiments.

DETAILED DESCRIPTION

Figure 1:
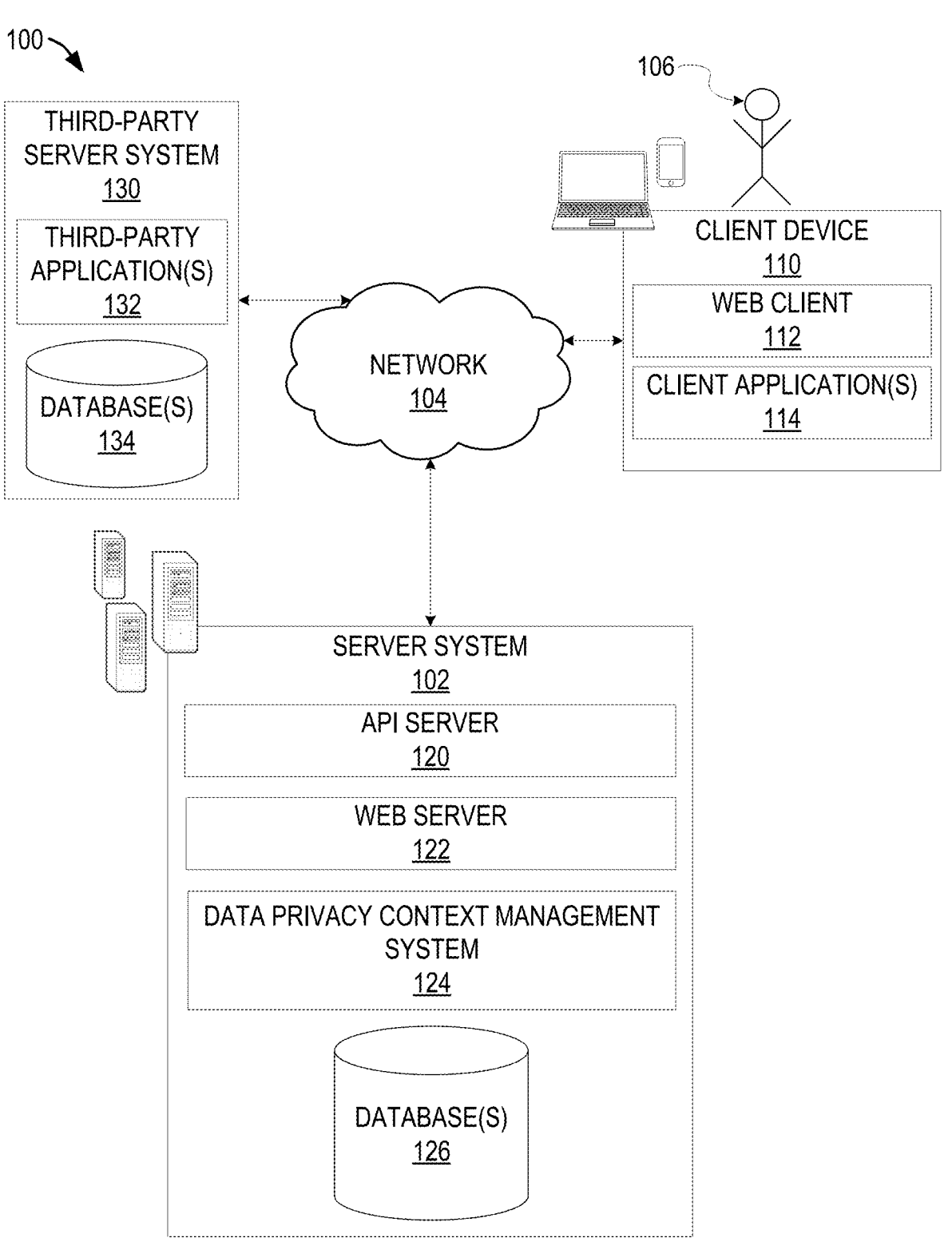
FIG. 1 is a block diagram illustrating a networked system, according to some example embodiments.

Systems and methods described herein relate to a data privacy context management system. A system can store and utilize personal user data, entity confidential data (e.g., banking data, vendor data), and other data that should remain private or confidential. Personal data can include information relating to a person that can be used to directly or indirectly identify the person, such as a name, identification number, location data, cultural and social identity, and so forth. Thus, it is important that the system maintain privacy of any confidential or user personal data within the system and when sharing data with other systems. The problem, however, is that a given entity does not know where all confidential and private data resides due to the very large volume of data as well as the complexity of the data structures and system processes. For example, as mentioned above, a large enterprise can have multiple independent business platforms that their customers and suppliers use, and, as such, confidential and personal data can become spread across those various business platforms. The challenge of managing personal data in these business environments is amplified because each business platform can have its own disparate set of tools, applications and policies for securing the private data that they are entrusted with.

For example, it is not possible for an entity to find all confidential and private data when an average enterprise stores over billions of files or hundreds of terabytes of data. Further, the data is typically structured such that not all data is visible to a user in the entity. For instance, data is often redundantly stored several times for performance, making for complex data structures. For example, data is indexed for faster performance which would not be known by an entity just looking at the functions of the system or there may be old data structures that were never deleted and thus still exist in the system unknown to an entity. There is no way to find or determine these complex data structures or old data structures manually. In addition, if an entity cannot use particular data due to privacy or confidential issues, it will significantly limit the ability to share data across systems. For example, when onboarding a new employee personal data will be input and stored with the system. Some of this personal information may then be needed to be shared with a procurement system so that the employee can have a company laptop shipped to their home address.

An entity's inability to secure private or confidential data can lead to reputational damage, loss of customer trust, and legal ramifications. Further, the entity could face compliance violations, such as violations of the General Data Protection Regulation (GDPR) and other privacy regulations. Non-compliance with GDRP, for example, can result in fines of up to 20 million Euros or 4% of a company's annual global turnover, whichever is higher.

Embodiments described herein provide for securing personal and other confidential data by generating a privacy context associated with personal data stored or processed by applications to ensure personal data is not processed beyond the context (purpose) for which it is stored. For example, in various entity computing system, master data is stored and shared across multiple applications in a distributed asynchronous manner. This can result in applications querying and processing data for which it has no legal basis or purpose to do so. The data privacy context management system described herein ensures that applications without purpose (privacy context) for processing personal data and other confidential data does not query or process this data. Accordingly, data is replicated or processed only with valid context behind it. The privacy context is generated by automatically identifying data privacy touch points and configurations need to have data privacy compliance.

Accordingly, the data privacy context management system described in further detail below safeguards personal information and other confidential data to effectively address the technical problems indicated above.

FIG. 1 is a block diagram illustrating a networked system 100, according to some example embodiments. The system 100 includes one or more client devices such as client device 110. The client device 110 can comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, wearable computing device, or any other computing or communication device that a user utilizes to access the networked system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 can be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 provides input (e.g., touch screen input or alphanumeric input) to the client device 110 and the input is communicated to other entities in the system 100 (e.g., third-party server system 130, server system 102) via a network 104. In this instance, the other entities in the system 100, in response to receiving the input from the user 106, communicate information to the client device 110 via the network 104 to be presented to the user 106. In this way, the user 106 interacts with the various entities in the system 100 using the client device 110.

The system 100 further includes a network 104. One or more portions of network 104 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 can access the various data and applications provided by other entities in the system 100 via web client 112 (e.g., a browser, such as the Internet Explorer® browser developed by Microsoft® Corporation of Redmond, Washington State) or one or more client applications 114. The client device 110 can include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an application for data privacy compliance, and the like.

In some embodiments, one or more client applications 114 are included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access a test environment privacy management system 124, and so forth), and so forth. Conversely, one or more client applications 114 may not be included in the client device 110, and then the client device 110 uses its web browser to access the one or more applications hosted on other entities in the system 100 (e.g., third-party server system 130, server system 102).

A server system 102 provides server-side functionality via the network 104 (e.g., the Internet or wide area network (WAN)) to one or more third-party server system 130 and/or one or more client devices 110. The server system 102 can include an application program interface (API) server 120, a web server 122, and test environment privacy management system 124 that is communicatively coupled with one or more databases 126.

The one or more databases 126 comprise storage devices that store data related to users of the system 100, applications associated with the system 100, cloud services, machine learning models, data related to entities/products/services, and so forth. The one or more databases 126 can further store information related to third-party server system 130, third-party applications 132, third-party database(s) 134, client devices 110, client applications 114, users 106, and so forth. In one example, the one or more databases 126 is cloud-based storage.

The server system 102 can be a cloud computing environment, according to some example embodiments. The server system 102, and any servers associated with the server system 102, can be associated with a cloud-based application, in one example embodiment.

The data privacy context management system 124 provides back-end support for third-party applications 132 and client applications 114, which can include cloud-based applications. The data privacy context management system 124 provides for generating a privacy context for system processes, among other functions as described in further detail below. The data privacy context management system 124 comprises one or more servers or other computing devices or systems.

The system 100 further includes one or more third-party server system 130. The one or more third-party server system 130 can include one or more third-party application(s). The one or more third-party application(s) 132, executing on third-party server(s) 130, can interact with the server system 102 via API server 120 via a programmatic interface provided by the API server 120. For example, one or more of the third-party applications 132 requests and utilizes information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 provides access to functionality that is supported by relevant functionality and data in the third-party server system 130. In another example, a third-party server system 130 is a system associated with an entity that accesses cloud services via server system 102.

The third-party database(s) 134 comprises storage devices that store data related to users of the third-party server system 130, applications associated with the third-party server system 130, cloud services, machine learning models, parameters, and so forth. The one or more databases 126 can further store information related to third-party applications 132, client devices 110, client applications 114, users 106, and so forth. In one example, the one or more databases 134 are cloud-based storage.

Figure 2A:
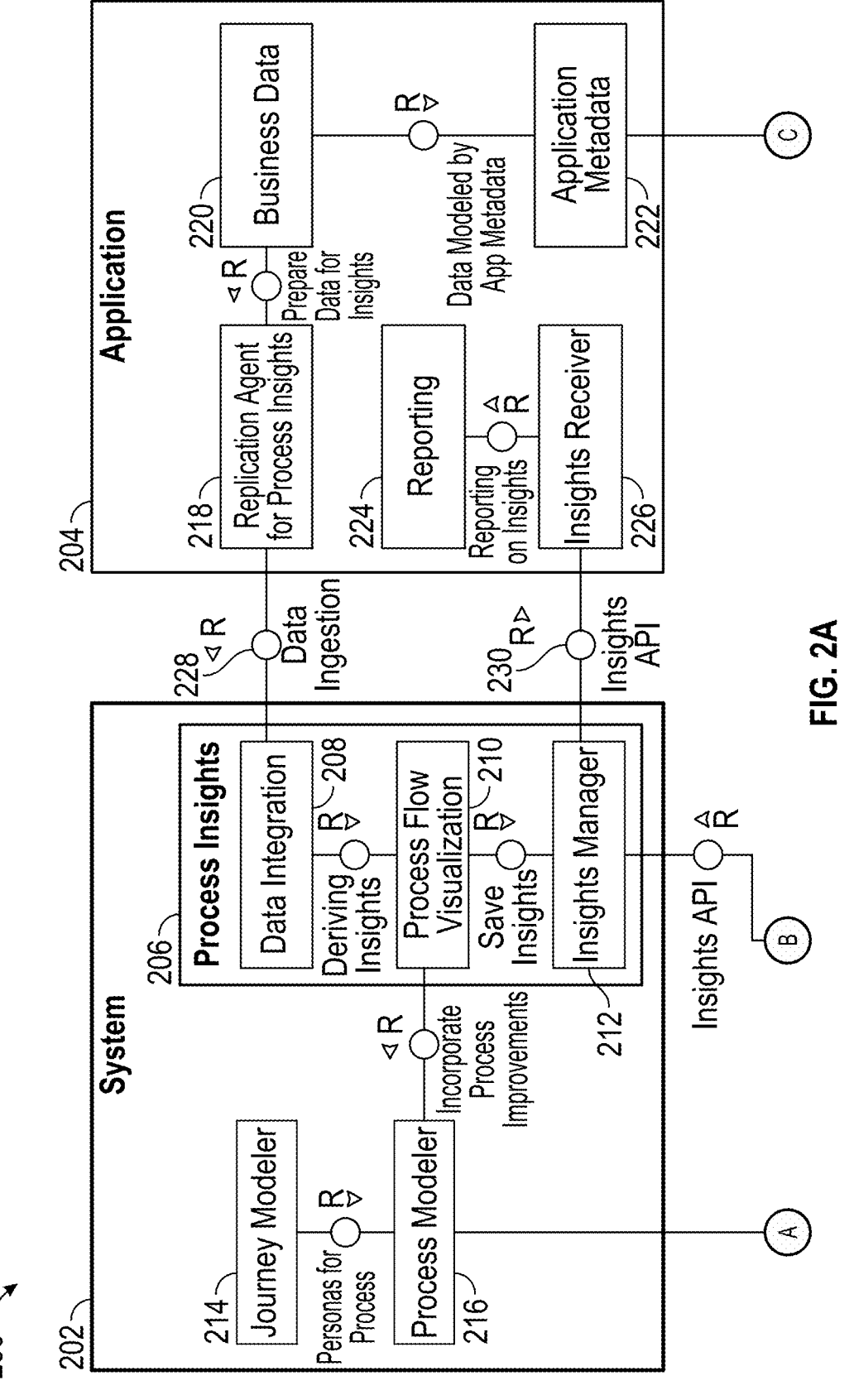
FIGS. 2A-2B illustrate a block diagram of a networked system, according to some example embodiments.
Figure 2B:
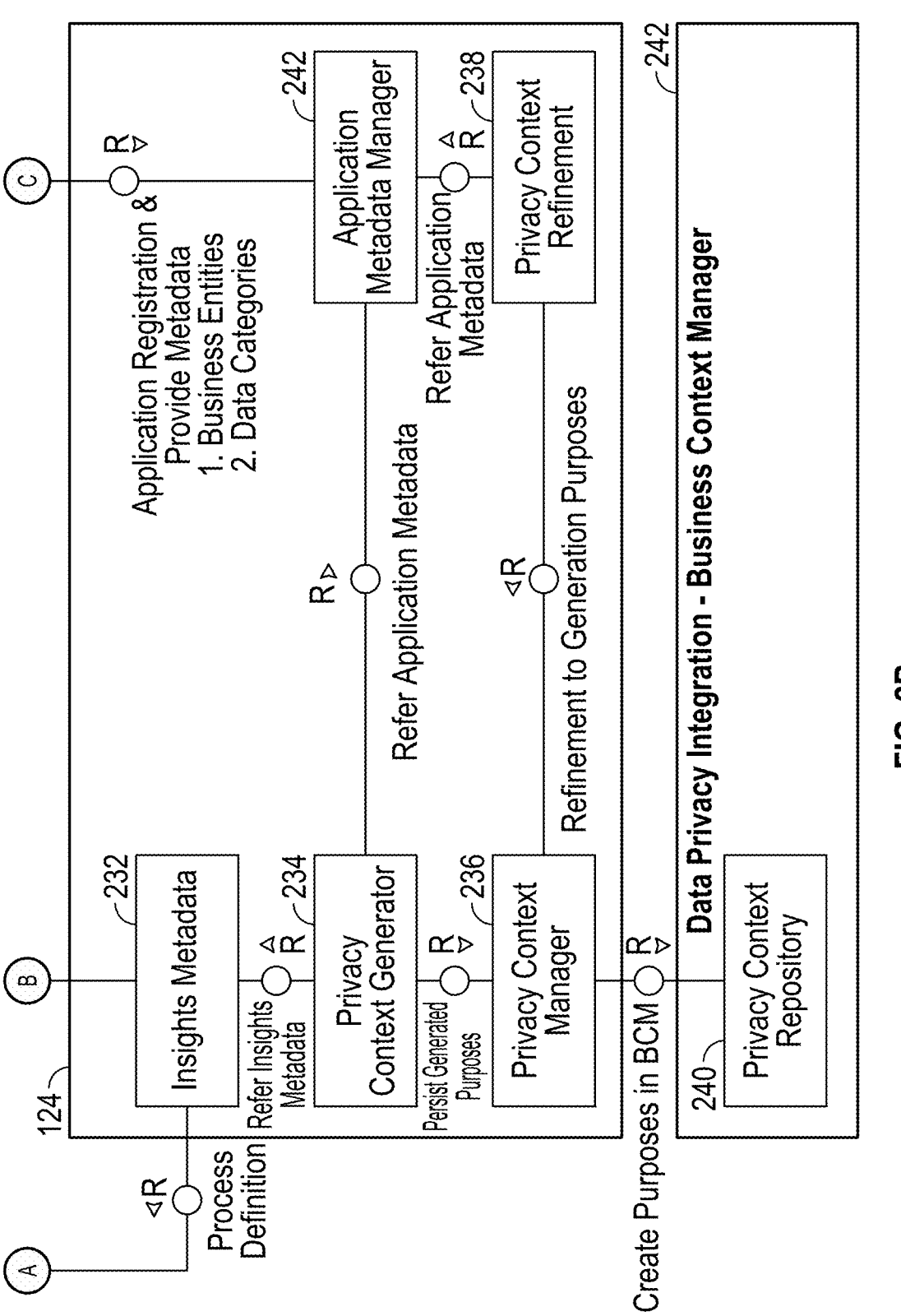

FIGS. 2A and 2B illustrate a block diagram 200 (split into two drawings due to size) showing further detail of the data privacy context management system 124 along with an example system 202 and application 204. The data privacy context management system 124 comprises one or more components or systems, examples of which are shown in FIGS. 2A and 2B, to generate a privacy context from a system process (e.g., via a process to purpose or context generator). It is to be understood that more or less components or systems can be utilized by the data privacy context management system 124, and that some components or systems could be combined into a single component or system, in example embodiments.

The example system 202 can be a system such as SAP's Signavio system that is used by entities to design, analyze and manage system processes. It is to be understood that other systems can be used in examples described herein. The data privacy context management system 124 can integrate with the example system 202 to extract information about a system process, such as process flow details for a process definition, objects involved in the system process, persona of data subjects involved in the system process, and so forth, to determine entities and other information about the system process.

The example system 202 comprises a process insights component 206 that provides data integration 208, process flow visualization 210 and an insights manager 212. The example system 202 further comprises a journey modeler 214 and a process modeler 216.

The example application 204 can be any application used by an entity, such as an employee onboarding application, a procurement application, or other application. Applications, such as the example application 204, are involved in processing data that can include personal data, and distribution of such data. The example application 204 can integrate with a system, such as example system 202, to generate system processes, insights to such process and allow improvements to the processes. The data privacy context management system 124 can integrate with the application to extract application metadata to generate entities, data categories processed in the application, and other information. The example application 204 comprises a replication agent for process insights 218, business data 220, application metadata 222, reporting 224 and insights receiver 226. As can be seen in FIGS. 2A and 2B, the example application 204 interacts with the example system 202 via data integration 228 and insights application programming interfaces (APIs) 230.

The data privacy context management system 124 comprises an insights metadata component 232 that is configured to interact with example system 202. For example, the insights metadata component 232 can communicate with the example system 202 to get system process insights via the insights manager 212 and to get information related to a process definition via a process modeler 216, in some examples. The data privacy context management system 124 further comprises an application metadata manager 242 configured to interact with example application 204. For example, the application metadata manager 242 can communicate with the example application 204 to get application metadata 222 from the example application 204. From the application metadata 222, the application metadata manager 242 can derive entities, data categories, and other data as explained in further detail below.

The data privacy context management system 124 further comprises a privacy context generator 234 that generates a privacy context from data derived from insights metadata 232 and the application metadata manager 242. The data privacy context management system 124 further comprises a privacy context manager 236 generated by the privacy context generator 234 and a privacy context refinement component 238 configured to refine the privacy context via input from a user via a user interface on a computing device (e.g., client device 110), other means.

The privacy context for a new, updated, or existing process is stored in a privacy context repository which can be part of the data privacy context management system 124, such as one or more database(s) 126, or part of a system separate from the data privacy context management system 124. In one example, the privacy context repository is part of a data privacy integration business context manager 242.

FIG. 3 is a flow chart illustrating aspects of a method 300, for generating a privacy context for a system process, according to some example embodiments. For illustrative purposes, method 300 is described with respect to the block diagram of FIG. 1, FIG. 2A and FIG. 2B. It is to be understood that method 300 may be practiced with other system configurations in other embodiments.

In operation 302, a computing system, such as the server system 102 or data privacy context management system 124, receives an event from an application. For example, a notification can be received by the computing system from an application, such as from the example application 204 shown in FIGS. 2A and 2B, or the computing system can determine that a new event has occurred in the application in some other manner. For example, the computing system can utilize an event orchestration system like the SAP Event Mesh to send and receive such events. As another example, API-based distribution of events can also be used in examples described herein.

In operation 304, the computing system analyzes the event to determine that a new system process has been created. For example, the event can indicate that a new system process has been created or that an existing system process has been updated. In this way, the computing system can generate a privacy context every time a new process is generated or an existing system process is updated.

Based on determining that a new system process has been generated, the computing system performs operations, such as operations 306-312, to generate a privacy context for the new system process. In some examples, the computing system generates the privacy context in real time, or near real time, from receiving the event from the application to ensure a privacy context is generated immediately upon generation of a new or updated system process.

In operation 306, the computing system analyzes application metadata associated with the new system process to determine a process definition for the new system process. For example, the computing system can analyze the application metadata to determine a field corresponding to a process definition. The process definition can then be used to determine process flow details.

For example, the computing system analyzes the application metadata to obtain information to determine a process definition such as a process name (e.g., recruitment process, hire to retire process, etc.). The computing system can analyze the application metadate to obtain other information, including the application name, the process name (e.g., process definition), roles of data subjects (e.g., workforce persons or employee, manager, etc.), organization attributes (e.g., company name, etc.), personal data categories (e.g., email, phone, CV, etc.), and other information. An example of data that the computing system generates from analyzing the application metadata includes the following:

Example format for data obtained from Application

```
{
    "application-name": "sap-sfsf",
    "process-name": "hire-to-retire",
    "data-subject-roles": [
        {
            "name": "workforce-person"
        },
        {
            "name": "manager"
        }
    ],
    "organization-attributes": [
```

-continued

```
{
    "name": "company-code",
    "values": [
        {
            "name": "abcorp-india",
            "value": "007"
        },
        {
            "name": "abcorp-germany",
            "value": "001"
        }
    ]
}
],
"personal-data-business-objects": [
    {
        "name": "workforce-person",
        "odm-name": "sap.workforce.WorkforcePerson",
        "data-categories": [
            {
                "name": "work-assignment"
            },
            {
                "name": "emails"
            },
            {
                "name": "phones"
            }
        ]
    },
    {
        "name": "job-profile",
        "odm-name": "sap.workforce.WorkforcePerson",
        "data-categories": [
            {
                "name": "job-profile"
            }
        ]
    },
    {
        "name": "purchase-requisition",
        "odm-name": "sap.businesspartner.BusinessPartner",
        "data-categories": [
            {
                "name": "organization"
            },
            {
                "name": "person"
            },
            {
                "name": "address-data"
            }
        ]
    }
]
}
```

In operation 308, the computing system extracts process flow details for the process definition. For example, the computing system can use the process definition to access process flow details for that process definition from a system, such as example system 202, to extract the process flow details.

Figure 4A:
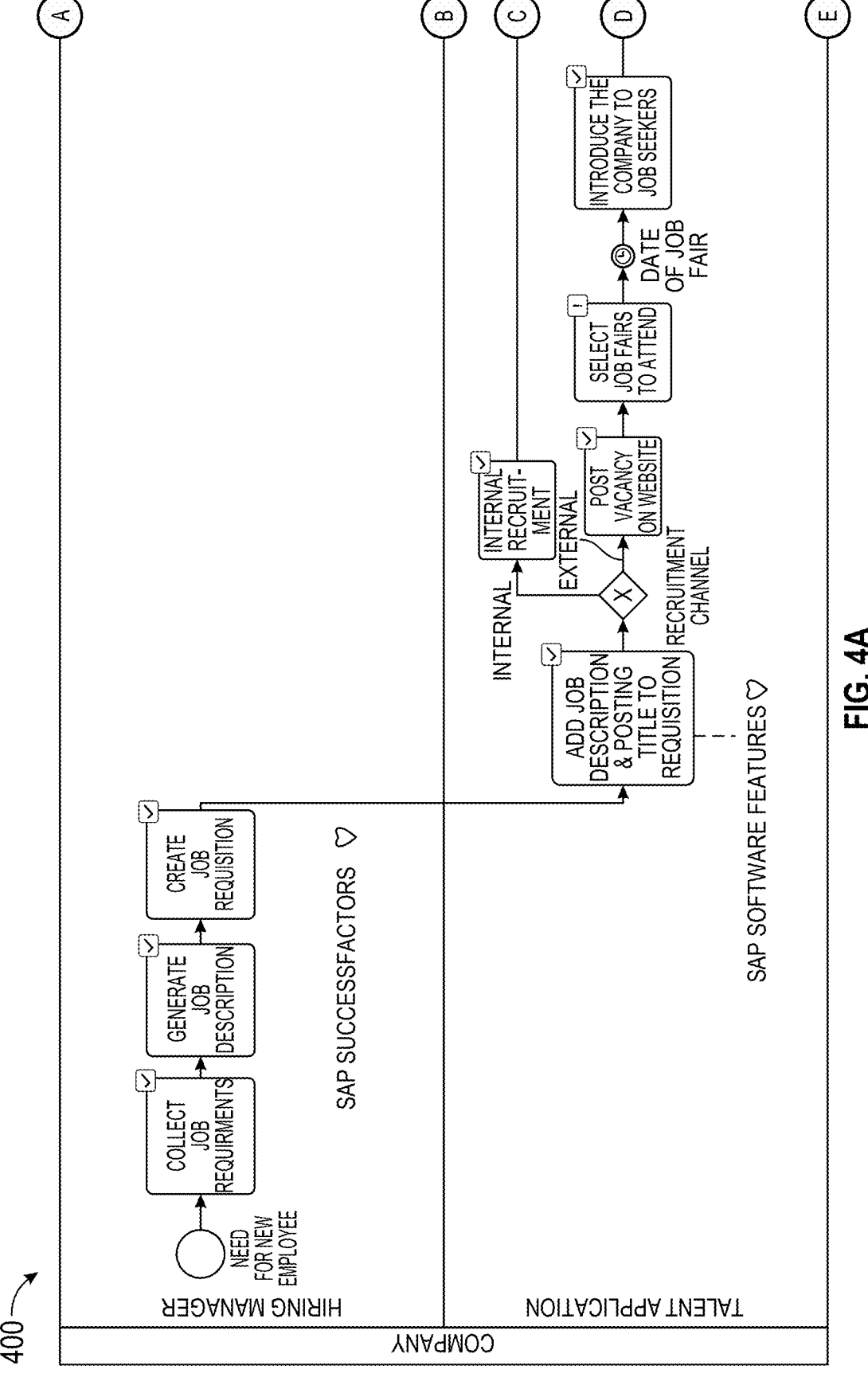
FIGS. 4A-4B illustrate an example system process flow, according to some example embodiments.
Figure 4B:
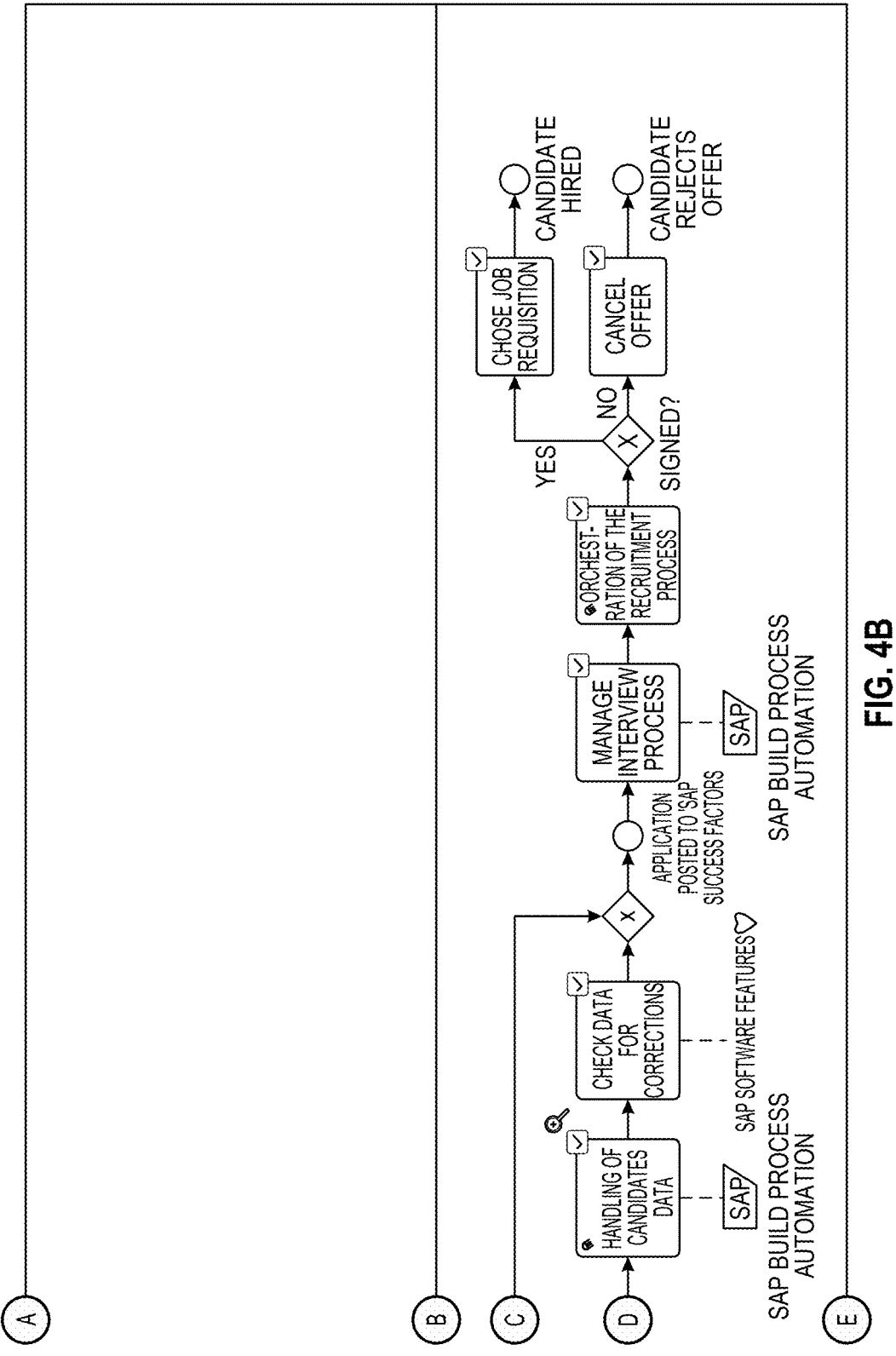

As explained above, one example system 202 is SAPs Signavio system. This type of system generates process flow details for a given system process. The computing system can communicate with the example system 202 via one or more APIs or other means to extract the process flow details for a process associated with the process definition. FIGS. 4A-4B (slit in two drawings due to size) shows a simple example process flow 400 generated by a system, such as example system 202. The example process flow 400 is for a recruitment process.

An example of data that the computing system extracts and generates from analyzing the application metadata includes the following. Note that this example or for a "hire-to-retire" system process:

Example format for data obtained from Signavio

```
{
    "process-definitions": [
        {
            "process-name": "hire-to-retire",
            "organization": {
                "name": "abcorp-india"
            },
            "subprocesses": [
                {
                    "subprocess-name": "recruitment-process",
                    "personas": [
                        {
                            "name": "hiring-manager"
                        },
                        {
                            "name": "candidate"
                        },
                        {
                            "name": "talent-acquisition"
                        }
                    ],
                    "process-steps": [
                        {
                            "name": "collect-job-requirement",
                            "persona": "hiring-manager"
                        },
                        {
                            "name": "generate-job-description",
                            "persona": "hiring-manager",
                            "business-objects": [
                                {
                                    "name": "job-profile"
                                }
                            ]
                        },
                        {
                            "name": "create-job-requisition",
                            "persona": "hiring-manager",
                            "business-objects": [
                                {
                                    "name": "job-profile"
                                },
                                {
                                    "name": "job-requisition"
                                }
                            ]
                        },
                        {
                            "name": "identify-recruitment-channel",
                            "persona": "talent-acquisition",
                            "business-objects": [
                                {
                                    "name": "job-profile"
                                },
                                {
                                    "name": "job-requisition"
                                },
                                {
                                    "name": "candidate-profile"
                                }
                            ]
                        },
                        {
                            "name": "candidate-application",
                            "persona": "candidate",
                            "business-objects": [
                                {
                                    "name": "job-profile"
                                },
                                {
                                    "name": "job-requisition"
                                },
                                {
                                    "name": "candidate-profile"
                                }
                            ]
```

9
-continued

```
        }
    ]
},
{
    "subprocess-name": "workforce-management",
    "organization": {
        "name": "abcorp-india"
    },
    "personas": [
        {
            "name": "employee"
        },
        {
            "name": "manager"
        },
        {
            "name": "human-resource-manager"
        }
    ],
    "process-steps": [
        {
            "name": "employee-onboarding",
            "persona": "talent-acquisition",
            "business-objects": [
                {
                    "name": "workforce-person"
                },
                {
                    "name": "pay-slip"
                }
            ]
        },
        {
            "name": "employee-training",
            "persona": "hiring-manager",
            "business-objects": [
                {
                    "name": "workforce-person"
                }
            ]
        },
        {
            "name": "employee-accessories",
            "persona": "employee",
            "business-objects": [
                {
                    "name": "workforce-person"
                },
                {
                    "name": "it-asset"
                },
                {
                    "name": "purchase-requisition"
                }
            ]
        }
    ]
}
]
}
```

In operation 310, the computing system analyzes the extracted process flow details to determine entities associated with the new system process and data categories associated with the new system process. For example, to determine entities associated with the new system process, the computing system determines which entities are associated with the entire process definition and any particular sub-processes.

In another example, the computing system determines data categories by identifying a subset of data that comprises or is associated with personal or other private or confidential data. For example, the system determines what data from the extracted flow details corresponds to a given set of data categories. The computing system associates a data category for each of the subset of data that comprises or is associated with personal or other private or confidential data. Some examples of data categories include email, address, phone number, name, and so forth.

In some examples, the computing system further determines systems associated with the new system process. In one example, the computing system analyzed the process definition to determine one or more systems associated with the new system process.

In operation 312, the computing system generates the privacy context based on the entities associated with the new system process and the data categories associated with the new system process. In some examples, the privacy context links a data controller, one or more data categories and a role. For example, a data controller is an entity responsible for the privacy context and means for processing data that includes personal information or other private or confidential data. The data categories correspond to data associated with personal or other confidential data, as explained above. In some examples, a role is a persona or a perspective a data subject brings to an application and can include a customer, employee, business partner, supplier and so on.

In some examples, the computing system maps the systems associated with the new process to the privacy context. In some examples, only the systems mapped to the privacy context have authorization to access personal data associated with the new system process.

An example of a privacy context that the computing system generates from the application metadata and the extracted process flow details includes the following. Note that this example or for a "hire-to-retire" system process:

Data Format for integration with Business Context Manager

```
{
    "business-contexts": [
        {
            "name": "hire-to-retire-recruitment-india",
            "data-subject-roles": [
                {
                    "name": "workforce-person"
                }
            ],
            "data-controllers": [
                {
                    "name": "abcorp-india"
                }
            ],
            "data-categories": [
                {
                    "business-object-name": "sap.workforce.WorkforcePerson",
                    "name": "work-assigments"
                },
                {
                    "business-object-name": "sap.workforce.WorkforcePerson",
                    "name": "emails"
                },
                {
                    "business-object-name": "sap.workforce.WorkforcePerson",
                    "name": "phones"
                }
            ]
        }
    ],
    "data-controllers": [
        {
            "name": "abcorp-india",
            "organization-attributes": [
                {
                    "name": "company-code",
                    "value": "007"
                }
            ]
        }
    ]
}
```

-continued

```
    ]
  }
 ]
}
```

The computing system can then store the privacy context for the new system process. In some examples, there can be more than one privacy context stored for a new system process.

In some examples, the computing system optionally causes display of the privacy context in a user interface on a computing device (e.g., client device 110). A user can then make any edits and other changes to the privacy context via the user interface. The computing system receives the changes to the privacy context via the user interface on the computing device and stores an updated privacy context including the changes to the privacy context. In this way, the privacy context can be tweaked or updated by a user, if needed.

In some examples, the computing system can detect that an existing system process has been updated. For example, the computing system receives a second event from the application or from another application (e.g., a second application) and analyzes the event to determine that an existing system process has been updated, as described above with respect to operations 302 and 304. The computing system generates or updates a privacy context for the existing system process, in real time from receiving the event from the application or second application, as described above with respect to operations 306-312. The computing system can then store the updated privacy context for the existing system process. The privacy context can be edited by a computing device as also explained above.

The privacy context can be used to authorize or deny access to personal data or other confidential data indicted by the privacy context. For example, the computing system, or other system corresponding to the privacy context, receives a request to access data associated with the new or updated system process. The request can be received from a computing device or other computing system. The computing system analyzes the request to determine whether the computing device or other computing system is authorized to access the data associated with the new system process based on the stored privacy context for the new system process. For example, the computing system determines a system, entity and/or purpose (or other information) of the request and compares it to the stored privacy context to determine if the system, entity, and/or purpose (or other information) aligns with the stored privacy context. Based on determining that the computing device or other computing system is not authorized to access the data associated with the new system process, the computing system denies access to the data. Based on determining that the computing device or other computing system is authorized to access the data associated with the new system process, the computing system grants access to the data.

In some examples, when determining to deny or grant access to the data, the computing system determines whether the request to access data is associated with data categories of the privacy context that are associated with personal or other confidential data. If the request is not for such data categories and instead is for data categories not associated with personal or other confidential data, the computing system can grant access to the non-personal or other non-confidential data.

Further, the privacy context can be used to generate reports, such as for privacy compliance purposes, that shows personal data stored and allows export capability and the ability to trigger correction and deletion of the data. The privacy context can be used to maintain rules and trigger deletion of data that have reached the end of purpose or context.

As indicated earlier, embodiments described herein provide a number of advantages and improvements. For instance, example embodiments automatically generate privacy context models for complete system processes to ensure privacy is captured as soon as a system process is created or an existing system process is updated. By addressing data privacy in the ways described herein, an entity using the systems and methods described herein can address cybersecurity threats, prevent identity theft and be compliant with various complex and constantly changing privacy regulations.

In view of the above disclosure, various examples are set forth below. It should be noted that one or more features of an example, taken in isolation or combination, should be considered within the disclosure of this application.

Example 1. A computer-implemented method comprising:
  receiving an event from an application;
  analyzing the event to determine that a new system process has been created;
  generating a privacy context for the new system process, in real time from receiving the event from the application, by performing operations comprising:
    analyzing application metadata associated with the new system process to determine a process definition for the new system process;
    extracting process flow details for the process definition;
    analyzing the extracted process flow details to determine entities associated with the new system process and data categories associated with the new system process; and
    generating the privacy context based on the entities associated with the new system process and the data categories associated with the new system process, the privacy context linking a data controller, one or more data categories and a role; and
  storing the privacy context for the new system process.
Example 2. A computer-implemented method according to any of the previous examples, wherein determining data categories associated with the new system process from the extracted process flow details comprises:
  identifying a subset of data that comprises or is associated with personal data; and
  associating a data category for each of the subset of data that comprises or is associated with personal data.
Example 3. A computer-implemented method according to any of the previous examples, wherein the data controller is an entity responsible for the privacy context and means for processing data that includes personal information or other private or confidential data.
Example 4. A computer-implemented method according to any of the previous examples, wherein one or more data categories include categories of personal data.
Example 5. A computer-implemented method according to any of the previous examples, further comprising:
  causing display of the privacy context in a user interface on a computing device;
  receiving changes to the privacy context via the user interface on the computing device; and storing an updated privacy context including the changes to the privacy context.

Example 6. A computer-implemented method according to any of the previous examples, further comprising:

determining systems associated with the new system process; and mapping the systems associated with the new system process to the privacy context.

Example 7. A computer-implemented method according to any of the previous examples, wherein only one or more specified systems associated with the new system process have authorization to access personal data associated with the new system process.

Example 8. A computer-implemented method according to any of the previous examples, further comprising:

receiving a second event from a second application;

analyzing the event to determine that an existing system process has been updated;

generating an updated privacy context for the existing system process, in real time from receiving the event from the second application, by performing operations comprising:

analyzing application metadata associated with the existing system process to determine a process definition for the existing system process;

extracting process flow details for the process definition for the existing system process;

analyzing the extracted process flow details to determine entities associated with the existing system process and data categories associated with the existing system process; and generating the updated privacy context based on the entities associated with the existing system process and the data categories associated with the existing system process, the updated privacy context linking a data controller, one or more data categories and a role; and storing the updated privacy context for the existing system process.

Example 9. A computer-implemented method according to any of the previous examples, further comprising:

receiving, from a computing system, a request to access to data associated with the new system process;

analyzing the request to determine whether the computing system is authorized to access the data associated with the new system process based on the stored privacy context for the new system process;

based on determining that the computing system is not authorized to access the data associated with the new system process, denying access; and based on determining that the computing system is authorized to access the data associated with the new system process, granting access.

Example 10. A computer-implemented method according to any of the previous examples, wherein analyzing the request further comprises:

determining whether the request is for data categories of the stored privacy context that are associated with personal or other confidential data; and granting access to access data associated with the new system process based on determining that the request is for data categories of the stored privacy context that are not associated with personal or other confidential data.

Example 11. A system comprising:

a memory that stores instructions; and one or more processors configured by the instructions to perform operations comprising:

receiving an event from an application;

analyzing the event to determine that a new system process has been created;

generating a privacy context for the new system process, in real time from receiving the event from the application, by performing operations comprising:

analyzing application metadata associated with the new system process to determine a process definition for the new system process;

extracting process flow details for the process definition;

analyzing the extracted process flow details to determine entities associated with the new system process and data categories associated with the new system process; and generating the privacy context based on the entities associated with the new system process and the data categories associated with the new system process, the privacy context linking a data controller, one or more data categories and a role; and storing the privacy context for the new system process.

Example 12. A system according to any of the previous examples, wherein determining data categories associated with the new system process from the extracted process flow details comprises:

identifying a subset of data that comprises or is associated with personal data; and associating a data category for each of the subset of data that comprises or is associated with personal data.

Example 13. A system according to any of the previous examples, wherein the data controller is an entity responsible for the privacy context and means for processing data that includes personal information or other private or confidential data.

Example 14. A system according to any of the previous examples, wherein one or more data categories include categories of personal data.

Example 15. A system according to any of the previous examples, the operations further comprising:

causing display of the privacy context in a user interface on a computing device;

receiving changes to the privacy context via the user interface on the computing device; and storing an updated privacy context including the changes to the privacy context.

Example 16. A system according to any of the previous examples, the operations further comprising:

determining systems associated with the new system process; and mapping the systems associated with the new system process to the privacy context.

Example 17. A system according to any of the previous examples, wherein only one or more specified systems associated with the new system process have authorization to access personal data associated with the new system process.

Example 18. A system according to any of the previous examples, the operations comprising:

receiving a second event from a second application;

analyzing the event to determine that an existing system process has been updated;

generating an updated privacy context for the existing system process, in real time from receiving the event from the second application, by performing operations comprising:

analyzing application metadata associated with the existing system process to determine a process definition for the existing system process;

extracting process flow details for the process definition for the existing system process;

analyzing the extracted process flow details to determine entities associated with the existing system process and data categories associated with the existing system process; and generating the updated privacy context based on the entities associated with the existing system process and the data categories associated with the existing system process, the updated privacy context linking a data controller, one or more data categories and a role; and storing the updated privacy context for the existing system process.

Example 19. A system according to any of the previous examples, the operations further comprising:

receiving, from a computing system, a request to access to data associated with the new system process;

analyzing the request to determine whether the computing system is authorized to access the data associated with the new system process based on the stored privacy context for the new system process;

based on determining that the computing system is not authorized to access the data associated with the new system process, denying access; and based on determining that the computing system is authorized to access the data associated with the new system process, granting access.

Example 20. A non-transitory computer-readable medium comprising instructions stored thereon that are executable by at least one processor to cause a computing device to perform operations comprising:

receiving an event from an application;

analyzing the event to determine that a new system process has been created;

generating a privacy context for the new system process, in real time from receiving the event from the application, by performing operations comprising:

analyzing application metadata associated with the new system process to determine a process definition for the new system process;

extracting process flow details for the process definition;

analyzing the extracted process flow details to determine entities associated with the new system process and data categories associated with the new system process; and generating the privacy context based on the entities associated with the new system process and the data categories associated with the new system process, the privacy context linking a data controller, one or more data categories and a role; and storing the privacy context for the new system process.

Figure 5:
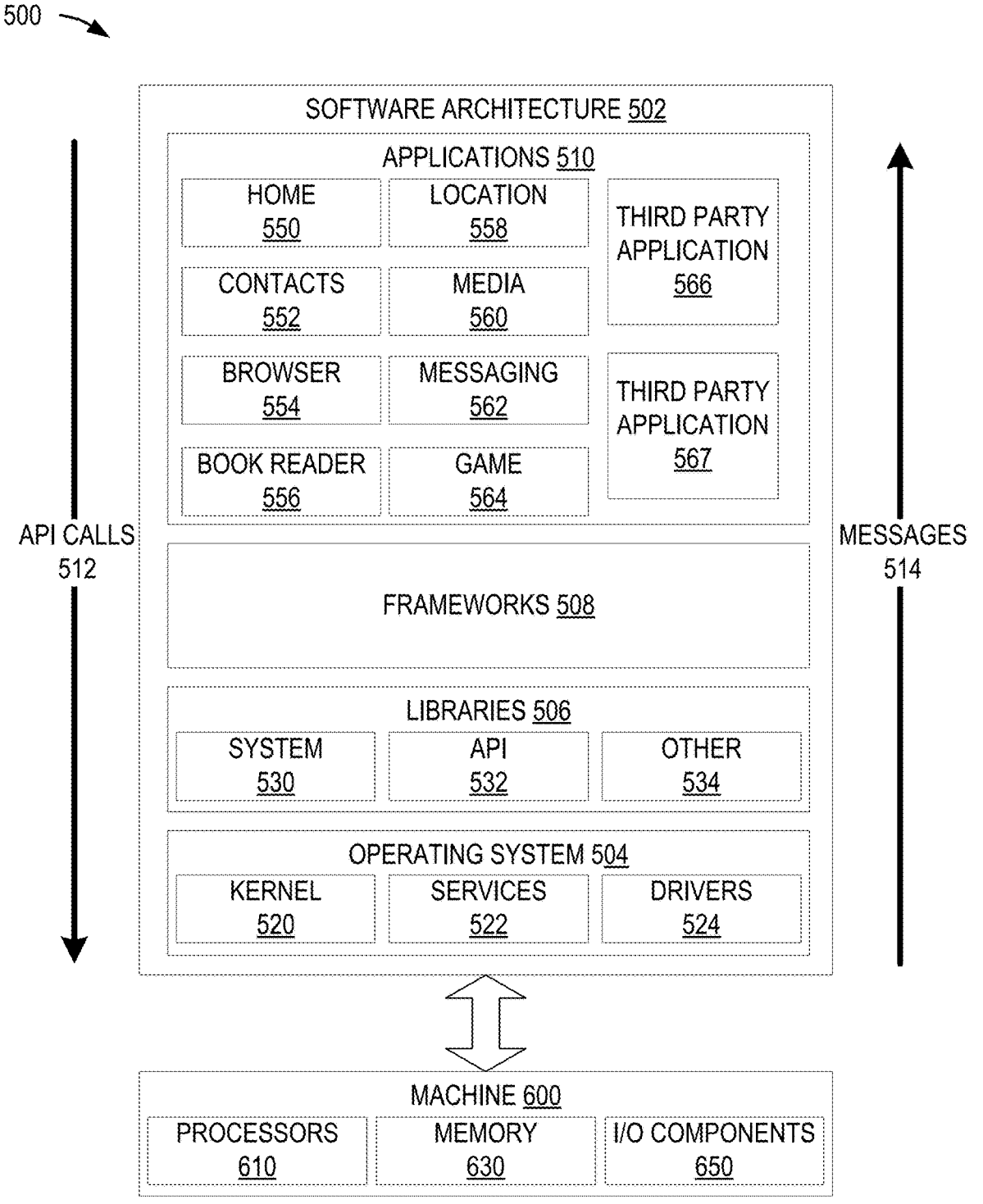
FIG. 5 is a block diagram illustrating an example of a software architecture that may be installed on a machine, according to some example embodiments.

FIG. 5 is a block diagram 500 illustrating software architecture 502, which can be installed on any one or more of the devices described above. For example, in various embodiments, client devices 110 and servers and systems 130, 102, 120, 122, and 124 may be implemented using some or all of the elements of software architecture 502. FIG. 5 is merely a non-limiting example of a software architecture, and it will be appreciated that many other architectures can be implemented to facilitate the functionality described herein. In various embodiments, the software architecture 502 is implemented by hardware such as machine 600 of FIG. 6 that includes processors 610, memory 630, and input/output (I/O) components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications such as third-party applications 566 and 567. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
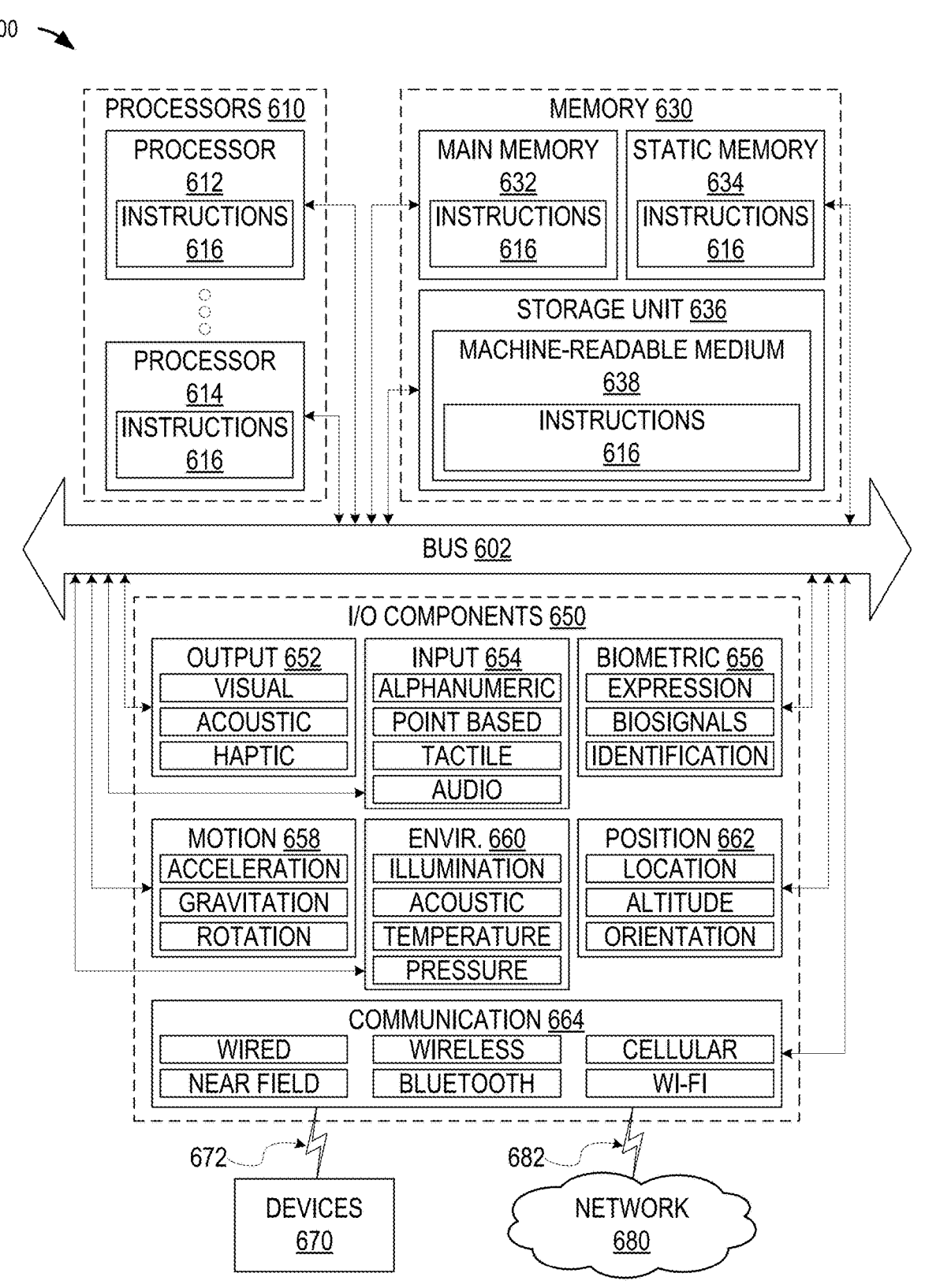
FIG. 6 illustrates a diagrammatic representation of a machine, in the form of a computer system, within which a set of instructions may be executed for causing the machine to perform any one or more of the methodologies discussed herein, according to an example embodiment.

FIG. 6 is a block diagram illustrating components of a machine 600, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine or system 130, 102, 120, 122, 124, etc., or a client device 110 in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 610 with a single core, a single processor 610 with multiple cores (e.g., a multi-core processor 610), multiple processors 612, 614 with a single core, multiple processors 612, 614 with multiples cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 650 include biometric components 656, motion components 658, environmental components 660, or position components 662, among a wide array of other components. For example, the biometric components 656 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 include acceleration sensor components (e.g., accelerometer), gravitation sensor components, rotation sensor components (e.g., gyroscope), and so forth. The environmental components 660 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine 600 or any of a wide variety of peripheral devices (e.g., a peripheral device coupled via a Universal Serial Bus (USB)).

Moreover, in some embodiments, the communication components 664 detect identifiers or include components operable to detect identifiers. For example, the communication components 664 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 616 are transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, in other example embodiments, the instructions 616 are transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Furthermore, the machine-readable medium 638 is non-transitory (in other words, not having any transitory signals) in that it does not embody a propagating signal. However, labeling the machine-readable medium 638 "non-transitory" should not be construed to mean that the medium is incapable of movement; the machine-readable medium 638 should be considered as being transportable from one physical location to another. Additionally, since the machine-readable medium 638 is tangible, the machine-readable medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving an event from an application;
   analyzing the event to determine that a new system process has been created;
   generating a privacy context for the new system process, in real time from receiving the event from the application, by performing operations comprising:
      analyzing application metadata associated with the new system process to determine a process definition for the new system process;
      extracting process flow details for the process definition;
      analyzing the extracted process flow details to determine entities associated with the new system process and data categories associated with the new system process; and

generating the privacy context based on the entities associated with the new system process and the data categories associated with the new system process, the privacy context linking a data controller, one or more data categories and a role; and
   storing the privacy context for the new system process.

2. The computer-implemented method of claim 1, wherein determining data categories associated with the new system process from the extracted process flow details comprises:
   identifying a subset of data that comprises or is associated with personal data; and
   associating a data category for each of the subset of data that comprises or is associated with personal data.

3. The computer-implemented method of claim 1, wherein the data controller is an entity responsible for the privacy context and means for processing data that includes personal information or other private or confidential data.

4. The computer-implemented method of claim 1, wherein one or more data categories include categories of personal data.

5. The computer-implemented method of claim 1, further comprising:
   causing display of the privacy context in a user interface on a computing device;
   receiving changes to the privacy context via the user interface on the computing device; and
   storing an updated privacy context including the changes to the privacy context.

6. The computer-implemented method of claim 1, further comprising:
   determining systems associated with the new system process; and
   mapping the systems associated with the new system process to the privacy context.

7. The computer-implemented method of claim 6, wherein only one or more specified systems associated with the new system process have authorization to access personal data associated with the new system process.

8. The computer-implemented method of claim 1, comprising:
   receiving a second event from a second application;
   analyzing the event to determine that an existing system process has been updated; and
   generating an updated privacy context for the existing system process, in real time from receiving the event from the second application, by performing operations comprising:
      analyzing application metadata associated with the existing system process to determine a process definition for the existing system process;
      extracting process flow details for the process definition for the existing system process;
      associated with the existing system process and data categories associated with the existing system process; and
      generating the updated privacy context based on the entities associated with the existing system process and the data categories associated with the existing system process, the updated privacy context linking a data controller, one or more data categories and a role; and
   storing the updated privacy context for the existing system process.

9. The computer-implemented method of claim 1, further comprising:

receiving, from a computing system, a request to access to data associated with the new system process;

analyzing the request to determine whether the computing system is authorized to access the data associated with the new system process based on the stored privacy context for the new system process;

based on determining that the computing system is not authorized to access the data associated with the new system process, denying access; and based on determining that the computing system is authorized to access the data associated with the new system process, granting access.

10. The computer-implemented method of claim 9, wherein analyzing the request further comprises:

determining whether the request is for data categories of the stored privacy context that are associated with personal or other confidential data; and granting access to access data associated with the new system process based on determining that the request is for data categories of the stored privacy context that are not associated with personal or other confidential data.

11. A system comprising:

a memory that stores instructions; and one or more processors configured by the instructions to perform operations comprising:

receiving an event from an application;

analyzing the event to determine that a new system process has been created;

generating a privacy context for the new system process, in real time from receiving the event from the application, by performing operations comprising:

analyzing application metadata associated with the new system process to determine a process definition for the new system process;

extracting process flow details for the process definition;

analyzing the extracted process flow details to determine entities associated with the new system process and data categories associated with the new system process; and generating the privacy context based on the entities associated with the new system process and the data categories associated with the new system process, the privacy context linking a data controller, one or more data categories and a role; and storing the privacy context for the new system process.

12. The system of claim 11, wherein determining data categories associated with the new system process from the extracted process flow details comprises:

identifying a subset of data that comprises or is associated with personal data; and associating a data category for each of the subset of data that comprises or is associated with personal data.

13. The system of claim 11, wherein the data controller is an entity responsible for the privacy context and means for processing data that includes personal information or other private or confidential data.

14. The system of claim 11, wherein one or more data categories include categories of personal data.

15. The system of claim 11, the operations further comprising:

causing display of the privacy context in a user interface on a computing device;

receiving changes to the privacy context via the user interface on the computing device; and storing an updated privacy context including the changes to the privacy context.

16. The system of claim 11, the operations further comprising:

determining systems associated with the new system process; and mapping the systems associated with the new system process to the privacy context.

17. The system of claim 16, wherein only one or more specified systems associated with the new system process have authorization to access personal data associated with the new system process.

18. The system of claim 11, the operations comprising:

receiving a second event from a second application;

analyzing the event to determine that an existing system process has been updated;

generating an updated privacy context for the existing system process, in real time from receiving the event from the second application, by performing operations comprising:

analyzing application metadata associated with the existing system process to determine a process definition for the existing system process;

extracting process flow details for the process definition for the existing system process;

associated with the existing system process and data categories associated with the existing system process; and generating the updated privacy context based on the entities associated with the existing system process and the data categories associated with the existing system process, the updated privacy context linking a data controller, one or more data categories and a role; and storing the updated privacy context for the existing system process.

19. The system of claim 11, the operations further comprising:

receiving, from a computing system, a request to access to data associated with the new system process;

analyzing the request to determine whether the computing system is authorized to access the data associated with the new system process based on the stored privacy context for the new system process;

based on determining that the computing system is not authorized to access the data associated with the new system process, denying access; and based on determining that the computing system is authorized to access the data associated with the new system process, granting access.

20. A non-transitory computer-readable medium comprising instructions stored thereon that are executable by at least one processor to cause a computing device to perform operations comprising:

receiving an event from an application;

analyzing the event to determine that a new system process has been created;

generating a privacy context for the new system process, in real time from receiving the event from the application, by performing operations comprising:

analyzing application metadata associated with the new system process to determine a process definition for the new system process;

extracting process flow details for the process definition;

associated with the new system process and data categories associated with the new system process; and generating the privacy context based on the entities associated with the new system process and the data categories associated with the new system process, the privacy context linking a data controller, one or more data categories and a role; and storing the privacy context for the new system process.

* * * * *